United States Patent [19]

Reinmold

[11] 4,012,974
[45] Mar. 22, 1977

[54] APPARATUS FOR CUTTING GLASS

[75] Inventor: Heinz-Josef Reinmold, Herzogenrath, Germany

[73] Assignee: Saint-Gobain Industries, Neuilly-sur-Seine, France

[22] Filed: July 25, 1975

[21] Appl. No.: 598,989

[30] Foreign Application Priority Data

Aug. 6, 1974 France .................. 74.27224

[52] U.S. Cl. .................. 83/6; 83/487; 83/614
[51] Int. Cl.² .................. B26D 3/08
[58] Field of Search .................. 83/6, 12, 487, 488, 83/614; 318/121

[56] References Cited

UNITED STATES PATENTS

| | | | |
|---|---|---|---|
| 1,296,634 | 3/1919 | DeGuire | 318/121 |
| 1,296,635 | 3/1919 | DeGuire | 318/121 |
| 1,954,831 | 4/1934 | Roller | 318/121 |
| 3,287,616 | 11/1966 | McNeil | 318/121 X |
| 3,797,339 | 3/1974 | Reinmold | 83/12 |
| 3,807,261 | 4/1974 | Couvreur | 83/12 X |

*Primary Examiner*—Frank T. Yost
*Attorney, Agent, or Firm*—Pennie & Edmonds

[57] ABSTRACT

A carriage carrying a cutting tool is guided along a predetermined path of travel, and motive power is provided by a linear induction motor having an armature mounted on the carriage and a plurality of short inductor windings discontinuously spaced along the path of travel. Means actuated by the carriage energizes predetermined windings successively in turn. Elastic means reverses the carriage at the end of the path of travel and switch means reverses the power on the return trip. D-C braking is provided as the carriage approaches its starting position.

8 Claims, 4 Drawing Figures

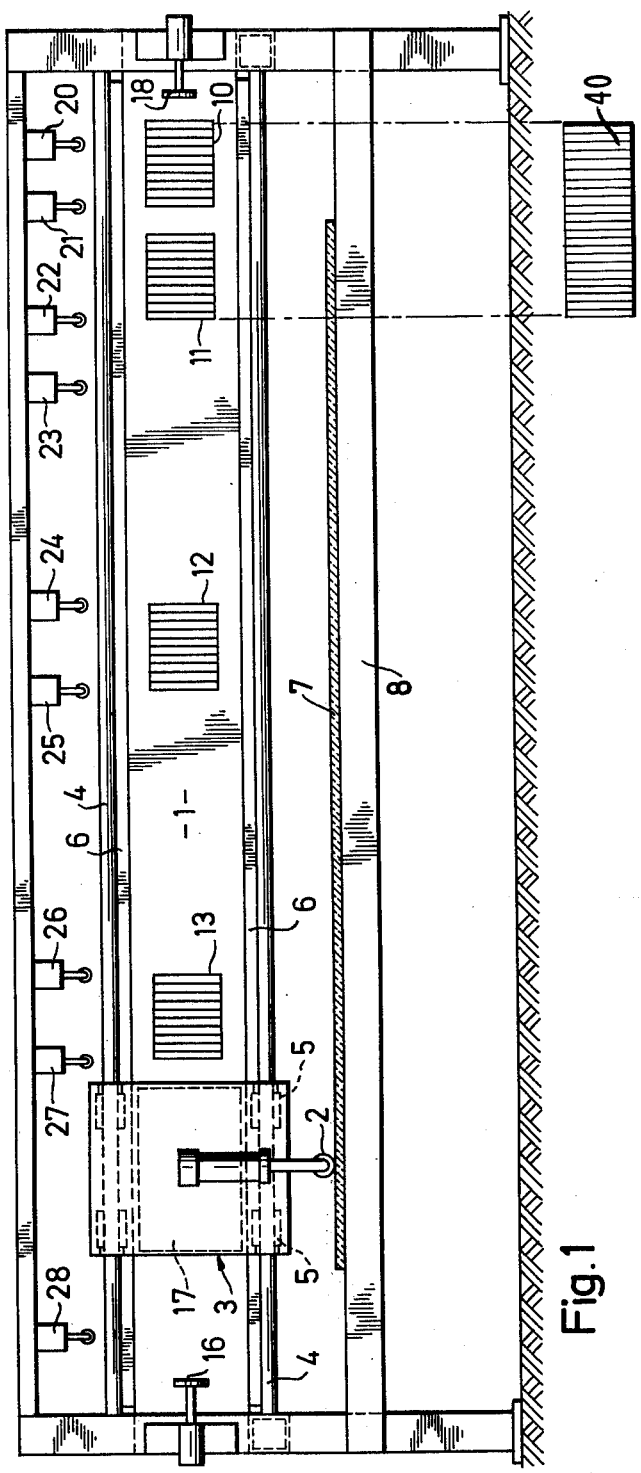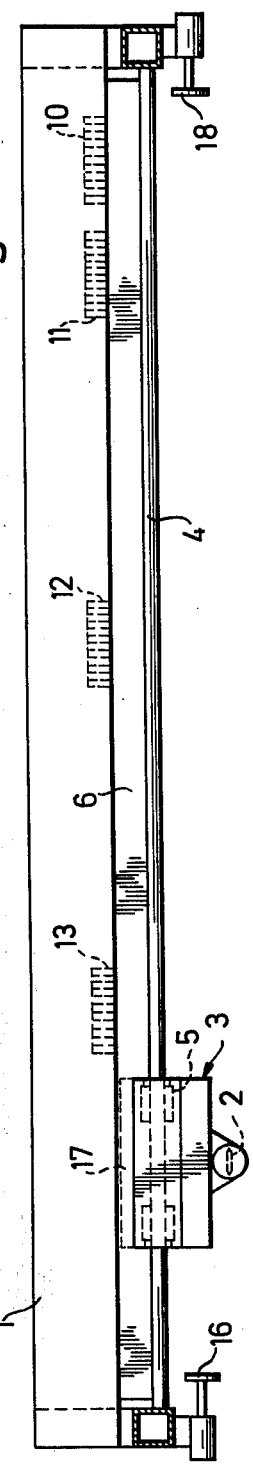

APPARATUS FOR CUTTING GLASS

The present invention relates to a device for tracing cutting lines on strips or sheets of glass with the aid of a tool attached to a carriage that moves along a slide bar guide, wherein the carriage and the slide bar each comprises one of the two elements of a linear motor which produces displacement of the carriage. Such an arrangement is described in U.S. Pat. No. 3,797,339.

Hitherto contemplated have been an arrangement of the inductor of the linear motor on the carriage, or an arrangement in the form of a stationary winding along the slide bar and using as armature a metal part on the carriage. The latter solution does not require equipping the carriage with a current supply and consequently makes the use of suspended movable cables unnecessary. However, it has the drawback of leading to very poor efficiency of the machine. In point of fact, there are high losses along the slide bar assembly which may even become warped if the heat liberated heats it on only one face.

The object of the invention is to modify such a device so as to improve its efficiency in the case where the inductor is mounted on the slide bar, while at the same time simplifying its construction.

This object is attained, the armature having the form of a metal part placed on the movable carriage, by division of the inductor into a plurality of short windings placed in discontinuous fashion along the slide bar. It has been found that when, for example, the slide bar is a rectilinear rail of a total length on the order of 6 m, it suffices to distribute along such slide bar four windings, each 30 cm in length, to obtain good operation and considerable improvement in efficiency.

It is advantageous to place, at the beginning of the path, i.e. in the starting position of the carriage, a winding longer in length than the others, or, if it is desired that all of the windings be of the same length, two or a plurality of windings are arranged one near the other. When once the carriage has been started at the desired speed by the windings located at the beginning of its path on the slide bar, it suffices as a general rule, still in the case of a slide bar 6 m long, to arrange one supplementary winding near the middle and another towards the end or at the place where the carriage is to reverse its path.

According to another advantageous feature, the different windings are supplied separately with current and hence are excited for only a short interval, when the carriage passes in their zone of action. This feature makes it possible to use relatively high currents without producing excessive losses and troublesome heating and it also improves the efficiency of the device. It is advantageous to arrange the control mechanisms for supply and cut-off of current along the slide bar, so that they will be operated by the carriage itself.

Other features of the invention appear from the description given hereinbelow of an example illustated by the following drawings, in which:

FIG. 1 shows a front view of a cutting device pursuant to the invention, with its principal parts;

FIG. 2 shows a view from above of the device represented in FIG. 1;

Figure 3:
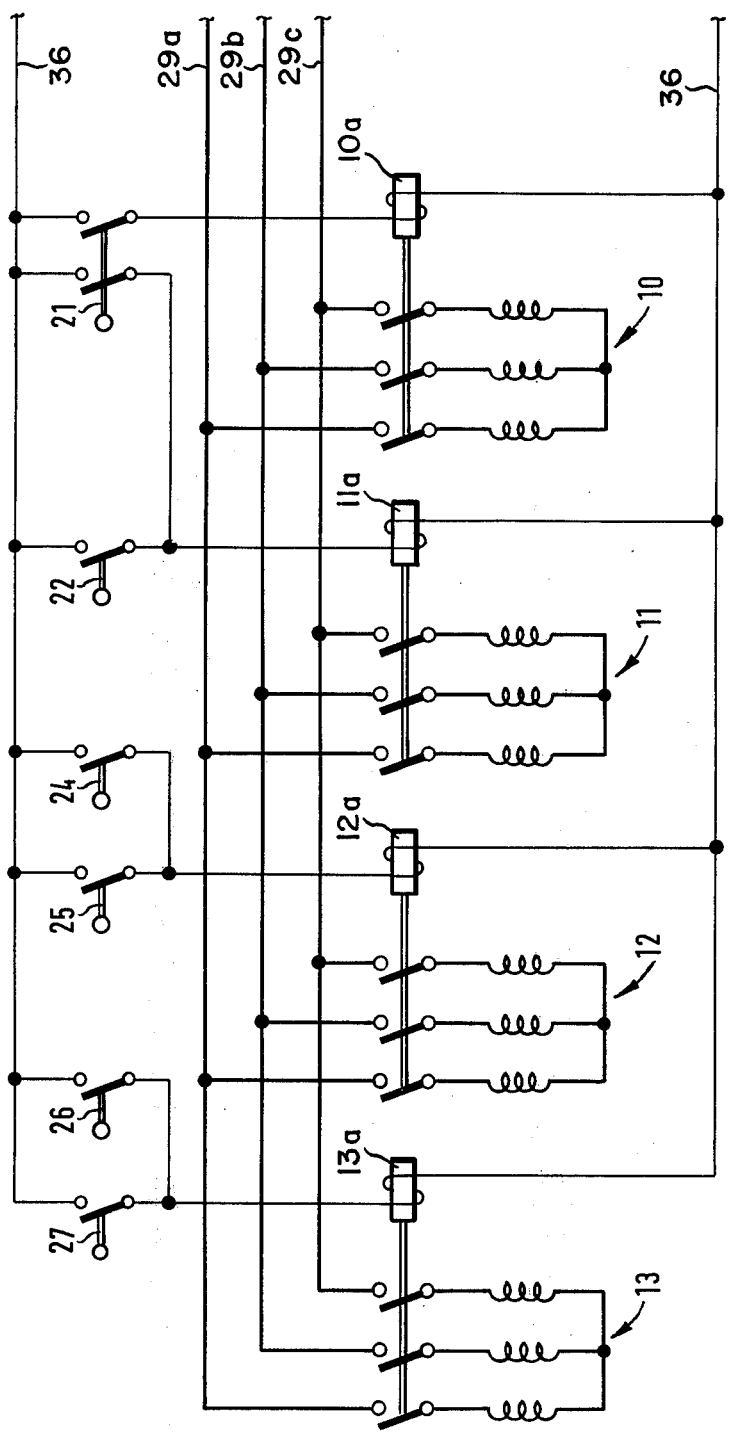
FIG. 3 shows the wiring diagram for supplying current to the motor windings.

The example represented relates to a cutting device permitting the execution of a rectilinear stroke.

This device comprises broadly a beam 1 serving as a bridge, along which is displaced a cutting tool 2 carried by the carriage 3.

Slide bars 4 bear and guide the carriage 3 along the beam 1. The carriage rests on said bars by ball bearings 5, and the bars themselves are held on the beam by a web 6. The sheet or strip of glass 7 to be cut rests on any appropriate device such as a table 8 or a conveyor. The guide beam 1 may be arranged fixed but it may alternatively, pursuant to well-known solutions, be mounted on a sliding course perpendicular to the direction of the carriage and, if desired, driven by the strip.

Four linear motor inductor windings 10, 11, 12 and 13 are arranged on the beam 1, on the side along which the carriage moves. Inductor plates carrying the windings may be fixed on the beam, without the slots for the windings necessarily being machined directly on said beam.

In one specific embodiment the total length of the beam is of the order of 6 m, and each of the windings is of the order of 30 cm long.

At the head of the path, i.e. in the starting position of the carriage 3, are arranged, very close to each other, two windings 10 and 11 which will impart sufficient acceleration to the carriage. The winding 12 is located near the middle of the beam and the winding 13 in the last third thereof.

The armature of the linear motor is placed on the carriage 3 and is made of a metal plate 17, non-ferromagnetic, such as an aluminum plate. The magnetic forces of attraction between inductor and armature are thus reduced to a minimum, making construction of the carriage bearings easier.

The various windings 10 to 13 are supplied with 3-phase alternating current during the go phase of the carriage displacement and each one imparts an impulsion thereto. When the carriage reaches the end of the slide bar, it strikes against the elastic parts 16 which may advantageously be composed of pneumatic jacks, the reaction of which throws the carriage back in the reverse direction so as to prepare its return to the starting position. For return, the feed of the two motor windings 12 and 13 is reversed, while the motor windings 10 and 11 are supplied with direct current so as to brake the carriage. A shock absorber 18 determines the stopping position of the carriage 3.

At the upper part of the beam 1 is located a series of switches actuated by the passage of the carriage 3, which control the movement of the carriage. The circuits associated with the switches will be described later in connection with FIGS. 3 and 4.

When the cutting tool is in operating position and a starting switch is closed, the windings 10 and 11 are supplied with alternating current through switch 21 and put the carriage 3 in motion. As soon as the carriage releases the switch 21, the feed of the winding 10 is cut off and only the winding 11 remains in service through switch 22, until the carriage has passed by switch 22. When the carriage reaches switch 24, the winding 12 is fed and remains so until the carriage has cleared the switch 25, switches 24 and 25 being connected in parallel. Similarly, the winding 13 is fed during passage of the carriage by switches 26 and 27 in parallel connection. When the carriage reaches the reversing switch 28, the latter reverses the A-C feeds to the windings 13 and 12, as controlled by switches 27-24, so as to accelerate the return movement of the carriage which has been started by the jack 16.

On the carriage's return trip the switches are acted upon in reverse order and, when the carriage reaches the switch 23, the two windings 10 and 11 are supplied with direct current to produce braking thereof. At the end of the run, the actuation of switch 20 cuts the current and permits the carriage to halt at the end of the beam in the position from which it will start again for tracing the next cutting stroke.

Figure 4:
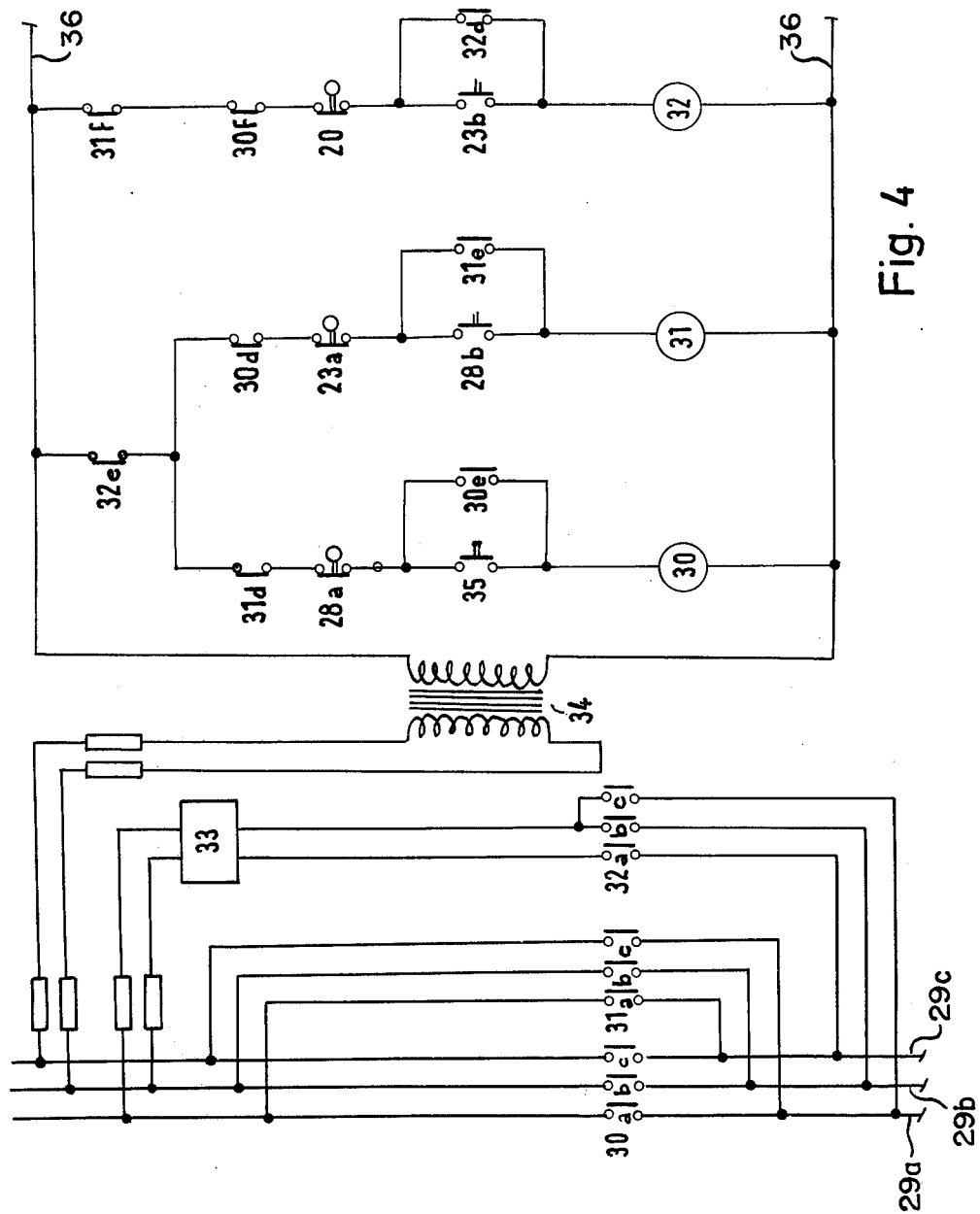
FIG. 4 shows the wiring diagram of the main control circuit.

The electrical control circuit is shown in the diagrams of FIGS. 3 and 4.

FIG. 3 represents the power network supplying the windings 10, 11, 12, 13 and the set of switches 21, 22, 24, 25, 26, 27 connecting the windings by turns during the passage of the carriage. FIG. 4 shows the power network supply for FIG. 3, with the relays controlling the overall operating cycle.

Actuation of the relay 30 (forward run) produces, by closure of contacts 30a, b, c, supply from the power network of 3-phase alternating current to lines 29a, b, c, and thence to the motor windings under the control relays 10a, 11a, 12a, 13a and the associated carriage actuated switches.

Actuation of the relay 31 (return run) likewise supplies, by the closure of contacts 31a, b, c, alternating current power to lines 29a, b, c, but it reverses the A-C feed.

Actuation of the relay 32 (braking) supplies direct current from the rectifier 33 to lines 29a, b, c.

A transformer 34 supplies low voltage current to the control relays through lines 36. The switch 35 is the starting switch.

As may readily be understood, operation is as follows: Closure of the switch 35 produces feed of the relay 30 through the enabling elements 32e, 31d and the reversing contact 28a. The memory contact 30e maintains such feed and the carriage starts. The momentary reversal of the switch 23 has no effect and the various motor windings are excited by turns, as FIG. 3 shows.

Reversal of the contacts 28a and 28b by the carriage 3 at the end of its forward travel cuts feed of the relay 30 and establishes feed of the relay 31 through the enabling elements 32e, 30d and the switch 23a. The memory contact 31e maintains this feed. As the carriage travels in the reverse direction, the windings 13 and 12 are excited in turn.

Reversal of the contacts 23a and 23b toward the end of the return travel of the carriage cuts the feed of the relay 31 and establishes feed of the relay 32 through the enabling elements 30f, 31f and the switch 20. The memory contact 32d maintains this feed and the windings 11 and 10, supplied with direct current, brake the carriage 3.

Opening of the switch 20 by the carriage at the end of its return travel then cuts the feed of the relay 32 and restores the whole system to its starting condition.

As will be understood from the foregoing, the present invention provides apparatus for producing cutting lines on strips or sheets of glass comprising a carriage, a cutting tool attached to said carriage for movement therewith, guide means for guiding said carriage along a predetermined path of travel, and linear motor means for producing movement of said carriage along said path of travel comprising an armature mounted on said carriage and a plurality of short inductor windings discontinuously spaced along the path of travel of said carriage. Further features are hereinbefore described in connection with the specific embodiment.

In the specific embodiment it will also be noted that each motor inductor winding 10-13 has a length along the path of travel of the carriage 3 which is a small fraction of the total path of travel, one-twentieth in the specific example given. If the initial pair of windings 10,11 are replaced by a winding longer than the others, such as shown at 40 in FIG. 1(a), it will still be only a small fraction of the total path of travel. Also, the combined length of the windings is much less than the total path of travel, one-fifth in the specific example given. The armature plate 17 on the carriage is also somewhat longer than the individual inductor windings. The spacing between selected windings such as 11-12 and 12-13 is also substantially greater than the length of the windings. These dimensions may of course be changed if desired, but in any event less heating and hence greater efficiency is produced.

I claim:

1. Apparatus for producing cutting lines on strips or sheets of glass comprising a carriage, a cutting tool attached to said carriage for movement therewith, guide means for guiding said carriage along a predetermined path of travel, and linear motor means for producing movement of said carriage along said path of travel comprising an armature mounted on said carriage and a plurality of short inductor windings discontinuously spaced along the path of travel of said carriage, the spacing between two or more successive inductor windings being greater than the length of the respective windings along the path of travel.

2. Apparatus according to claim 1 in which the inductor winding at the beginning of said path of travel has a length along the path of travel greater than the other windings along the path of travel.

3. Apparatus according to claim 1 in which said windings are of approximately the same length along said path of travel and the spacing between the two windings at the beginning end of the path of travel is small compared to the spacing between succeeding windings along the path of travel.

4. Apparatus according to claim 1 in which said windings are separately energizable and including means for energizing predetermined windings successively in turn as said carriage travels along said path of travel.

5. Apparatus according to claim 3 including means for energizing simultaneously said two windings at the beginning end of the path of travel and energizing subsequent windings along the path of travel successively in turn.

6. Apparatus according to claim 1 including switch means positioned along said path of travel and actuated by passage of said carriage thereby for successively energizing and deenergizing said inductor windings.

7. Apparatus according to claim 1 in which said armature of the linear motor means is a plate of a non-ferromagnetic metal.

8. Apparatus according to claim 1 in which said guide means is rectilinear and including elastic means at the end thereof remote from the starting end of the carriage for rebounding the carriage toward the starting end.

* * * * *